United States Patent [19]

Takanashi et al.

[11] Patent Number: 5,087,929
[45] Date of Patent: Feb. 11, 1992

[54] METHOD ELECTROPHOTOGRAPHIC PRINTING

[75] Inventors: Itsuo Takanashi, Kamakura; Takashi Yamamura, Yokohama; Shintaro Nakagaki, Miura; Toshikatsu Ichito, Kawasaki; Atsushi Nakano, Sagamihara; Tadayuki Shimada; Toshio Konno, both of Yokohama, all of Japan

[73] Assignee: Victor Company of Japan, Ltd., Yokohama, Japan

[21] Appl. No.: 637,171

[22] Filed: Jan. 3, 1991

[30] Foreign Application Priority Data

Jan. 5, 1990 [JP] Japan .................................... 2-280

[51] Int. Cl.$^5$ .......................... H04N 1/21; G01D 9/42
[52] U.S. Cl. .................................. 346/108; 346/160
[58] Field of Search ............... 346/108, 107 R, 76 L, 346/160, 153.1, 155; 350/374, 372; 358/213.11, 217

[56] References Cited

U.S. PATENT DOCUMENTS 4,559,546 12/1985 Yip ........................................ 346/108
4,956,714 9/1990 Takanashi et al. ............. 358/213.11

FOREIGN PATENT DOCUMENTS 2101880 4/1990 Japan .

Primary Examiner—Mark J. Reinhart
Attorney, Agent, or Firm—Michael N. Meller

[57] ABSTRACT

A method of electrophotographic printing is disclosed. A recording medium comprising a photoconductive member and photo-modulation member laminated to each other, both exhibiting a photoelectric effect and a sensitized member made of a chargeable photoconductive member are arranged so as to face each other. A first electro-magnetic radiation beam (abbreviated in a beam hereinafter) which is intensity-modulated with data to be recorded is radiated to the recording medium at the photoconductive member side thereof to record the data to the photo-modulation member with the photoelectric effect. A second beam of constant intensity is radiated to the recording medium to emit therefrom a third beam exhibiting intensity variation subjected to the recorded data. The sensitized member is exposed with the third beam to form thereon a charge image corresponding to the recorded data. Toner is stacked onto the sensitized member formed with the charge image to form thereon a toner image. The toner image is then transferred onto a printing paper, thus to perform repeated printing utilizing the data once recorded to the recording medium.

9 Claims, 3 Drawing Sheets

METHOD ELECTROPHOTOGRAPHIC PRINTING

BACKGROUND OF THE INVENTION

The present invention relates to a method of electrophotographic printing.

An electric copying machine by way of electrophotography has been widely known in the field of copying technology in which an optical image of an original (a manuscript) of a document or drawing for example, is restored by means of energy of an electro-magnetic radiation beam and a sensitized member.

In the copying machine, a charge latent image corresponding to an optical image of the original is formed on the sensitized member to which a charged photoconductive member is applied and is developed by toner to get a hard copy.

A laser printer also has been widely used in recent years. The laser printer uses a charged photoconductive member as a sensitized member which is scanned by a spot of a laser beam whose intensity is modulated by means of information signals to be recorded to form a charge latent image corresponding to the information signals on the sensitized member. The charge image is developed to obtain a hard copy.

There is further an electrophotographic apparatus to which the copying machine as well as the laser printer are applied.

As is well known, the copying process of an electric copying machine by way of electrophotography is as follows: Firstly, an original optical image is exposed on a sensitized member of a pre-charged photoconductive member to form a charge latent image corresponding to the original optical image thereon.

The charge latent image is then developed by toner and the developed image is transferred onto a transfer paper and is fixed thereon to obtain a hard copy. (The paper needs not be a transfer paper if the paper itself is a sensitized member.)

It is therefore required to two-dimensionally expose an original optical image on a sensitized member of a pre-charged photoconductive material each time in order to obtain a duplicate. Consequently, it is difficult to speed up the copying rate.

It is thus general to obtain many duplicates by means of not a copying machine but a printing machine. In order to solve such a problem, there is an apparatus as a copying machine by way of electrophotography but also doubles as a printing machine disclosed in U.S. Pat. No. 2,576,047.

The apparatus disclosed in the US patent employs zinc oxide as a pre-charged photoconductive material as a sensitized member. When the apparatus operates in printing mode, an original optical image is exposed on a sensitized member to form a charge latent image corresponding to the original optical image thereon.

The charge latent image is then developed by toner to obtain a fixed image as a master. The master is charged and exposed entirely and is further developed by toner. The developed image is transferred onto a transfer paper and is fixed thereon to obtain a duplicate.

It is essential for companies active in an information-oriented society to document information selected from much information and to deliver the documents to sections in the companies which need that information as soon as possible.

It is therefore required for the documenting mentioned above to duplicate an original by a copying machine, to document the original by a word processor and to obtain many duplicates by copying operation of a copying machine or printing operation of a printing machine.

With an improvement of functions of an electric copying machine, particularly its copying rate, companies have not ordered a printing office but have duplicated documents by themselves with their copying machines if the number of copies is not great.

However, as already mentioned, it is difficult to speed up the copying rate so that a printing machine must be used instead of a copying machine if so many documents.

An apparatus which operates as a copying machine but also doubles as a printing machine by way of electrophotography is useful under such circumastances.

However, the apparatus disclosed in U.S. Pat. No. 2,576,047 already mentioned needs troublesome operation to detach a master used in the printing mode from the apparatus and to install a new sensitized member therein when the printing mode is switched to the copying mode. The apparatus also cannot operate as a laser printer.

SUMMARY OF THE INVENTION

An object of the present invention is to provide a method of electrophotographic printing in which many duplicates can be obtained at a high copying rate.

According to the present invention, there is provided a method of electrophotographic printing in which firstly a recording medium comprising a photoconductive member and photo-modulation member laminated to each other, both exhibitng photoelectric effect and a sensitized member made of a chargeable photoconductive member are arranged so as to face each other.

Next, a first electro-magnetic radiation beam which is intensity-modulated with data to be recorded is radiated to the recording medium at the photoconductive member side thereof to record the data to the photo-modulation member with the photoelectric effect.

A second electro-magnetic radiation beam of constant intensity is further radiated to the recording medium to emit therefrom a third electro-magnetic radiation beam exhibiting intensity variation subjected to the recorded data.

The sensitized member is exposed with the third electro-magnetic radiation beam to form thereon a charge image corresponding to the recorded data and toner is stacked onto the sensitized member formed with the charge image to form thereon a toner image.

The toner image is then transferred onto a printing paper, to thus perform repeated printing utilizing the data once recorded to the recording medium.

Accordingly, the present invention is advantageous in that many duplicates can be obtained at a high copying rate.

The other objects and features of the present invention will become understood from the following description with reference to the accompanying drawings.

DETAILED DESCRIPTION OF THE PREFERRED EMBODIMENTS

Figure 1:
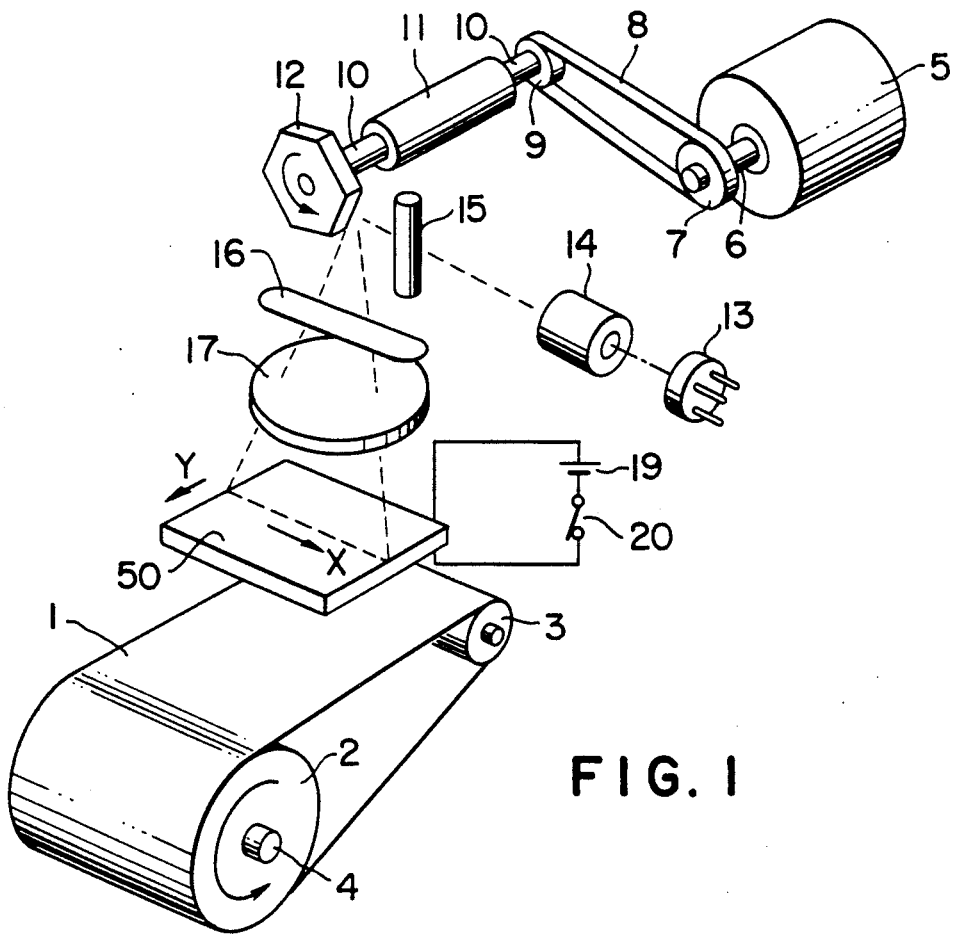
FIG. 1 shows a perspective diagrammatic configuration of a recording apparatus applied with electrophotographic printing according to the present invention, particularly the component parts thereof used in production of a master for printing.

The present invention will now be described in detail with reference to the accompanying drawings. Throughout the drawings, like reference numerals and letters are used to designate like or equivalent elements for the sake of simplicity of explanation.

FIG. 1 shows a diagrammatic configuration of a recording apparatus applied with electrophotographic printing according to the present invention, particularly the component parts thereof used in production of a master for printing.

Figure 2:
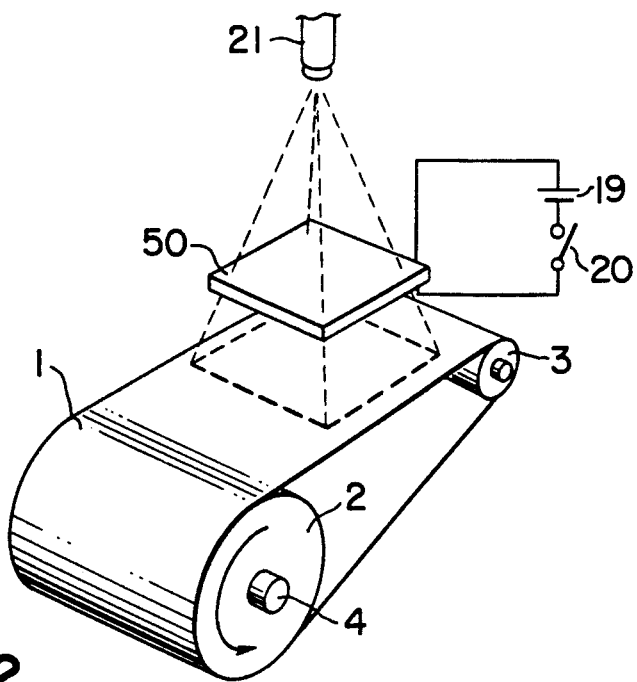
FIG. 2 shows a perspective diagrammatic configuration the component parts of the apparatus shown in FIG. 1 used in production of a duplicate by means of the master produced in FIG. 1 and also the operational principle thereof according to the present invention.

FIG. 2 shows the component parts of the apparatus shown in FIG. 1 used in production of a duplicate by means of the master produced in FIG. 1 and also the operational principle thereof.

The recording apparatus shown in both FIGS. 1 and 2 comprises a belt like sensitized member 1 which is wound arround a drive roller 2 and passive roller 3. The drive roller 2 is rotated by a rotation shaft 4 which is further rotated by a drive power supply (not shown). The sensitized member 1 is coated with a sensitized layer and needs not be belt-like.

An optical system for focussing an optical image on the sensitized member 1 as well as mechanism related thereto are omitted from FIGS. 1 and 2. Further omitted therefrom are a charging section developing section, transfer section, fixing section, cleaning section, paper feed section, paper deliver section, etc. which might be provided arround the sensitized member 1.

The recording apparatus shown in FIG. 1 comprises a motor 5 with a rotary shaft 6 and a polygon mirror 12 with a rotary shaft 10. A drive pulley 7 fixed to the rotary shaft 6 and a pulley 9 fixed to the rotary shaft 10 via a bearing 11 are linked together by a belt 8. The polygon mirror 12 is rotated by the motor 5 via the component parts mentioned above.

The recording apparatus further comprises a semiconductor laser source 13 which emits a laser beam. There are also provided a collimator lens 14 and cylindrical lens 15 through which the laser beam passes.

When the laser beam which passed therethrough is sequentially incident to mirriors of the polygon mirror 12, the laser beam is reflected there and is then deflected in the surface including the cylindrical axis of the cylindrical lens 15 and optical axis of the laser beam.

There are further provided a troidal lens 16, doublet spatial lens 17 and recording medium 50 in FIG. 1. The deflected laser beam is incident to the recording medium 50 via the lenses 16 and 17 to conduct main scanning on the recording medium 50 in the direction X.

Subsidiary scanning is conducted in the recording medium 50 in the direction Y in FIG. by a transfer mechanism (not shown). The recording medium 50 is recorded with data if the laser beam is modulated in its intensity with the data.

Figure 3:
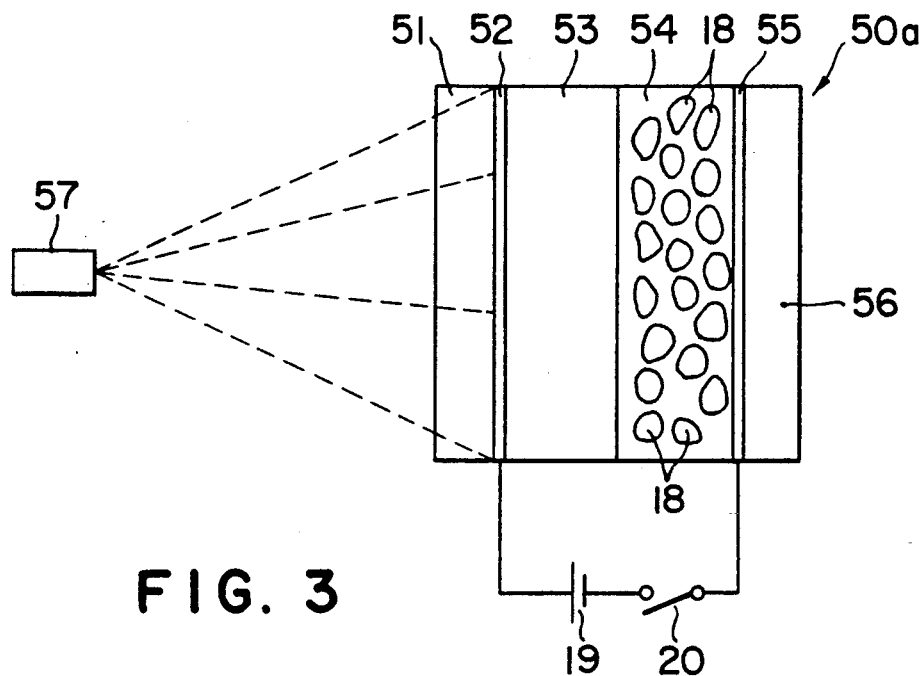
FIG. 3 shows an example of a recording medium used in the recording apparatus shown in FIGS. 1 and 2 according to the present invention.

FIG. 3 is an example of configuration of a recording medium. A recording medium 50a comprises substrates 51 and 56 of macromolecular material, transparent electrodes 52 and 55 made of such as Indium-Tin Oxide membrane, a photoconductive layer (abbreviated in a HCL hereinafter) member 53 and a macromolecular-liquid crystal memory (abbreviated in a HLM hereinafter) membrane 54 as a photo-modulation layer.

The HLM membrane 54 is composed such that nematic or smectic liquid crystals which have the cnaracteristics as the liquid crystal at a room temperature and have high volume resistivity are dispersed in the macromolecular material such as methacrylic resin, polyester resin, polycarbonate resin, vinyl chloride resin, poly amide resin, polyethylene resin, polypropylene resin, polystyrene resin and silicone resin, having volume resistivity of $10^{14}$ $\Omega$cm or more.

The HLM membrane 54 further may be laminated thereon with a dielectric layer of thin membrane composed of such as methacrylic resin, polyester resin, polycarbonate resin, vinyl chloride resin, poly amide resin, polyethylene resin, polypropylene resin, polystyrene resin and silicone resin, having volume resistivity of $10^{14}$ cm or more.

The liquid crystals in the HLM membrane 54 are enclosed in numerable pores 18 randomly distributed in the macromolecular material.

Employment of the liquid crystals having higher volume resistivity and viscosty results in the reproduction of data with higher contrast ratio or higher recording performance.

Furthermore, employment of the liquid crystals having a lower melting point than that of the macromolecular material is advantageous to compose a recording medium in which recorded data can be erased.

Recording operation of data to the recording medium 50a, reproduction operation of the data therefrom and erasing operation of the data therefrom will be explained as follows with reference to FIG. 3.

First in the recording operation, an electro-magnetic radiation beam source (abbreviated in a light source hereinafter) 57 radiates an electro-magnetic radiation beam (abbreviated in a beam hereinafter) whose intensity is modulated with data to be recorded to the recording medium 50a. The beam may be focused on the recording medium 50a via an imaging lens (not shown).

In FIG. 3, between the transparent electrodes 52 and 55, a series circuit of a power supply 19 and switch 20 is connected. The switch 20 is turned on to apply a voltage from the power supply 19 across the electrodes 52 and 55 for the recording operation.

The electric resistance of the PCL member 53 varies accordingly with the intensity of the beam incident thereto from the light source 57 via the substrate 51.

The field distribution induced across the PCL member 53 and transparent electrode 55 by the voltage applied thereacross further varies accordingly with the intensity of the beam incident thereto.

An electric field with intensity distribution corresponding to the intensity of the beam is thus applied to the HLM membrane 54.

Consequently, the nematic or smectic liquid crystals enclosed in the pores 18 in the HLM membrane 54 are reoriented accordingly with the magnitude of the intensity of the electric field applied thereto so as to increase transparency of the HLM membrane 54 as the electric field applied to the liquid crystals increases beyond a threshold level.

Orientation direction of the liquid crystals thus changed is not changed any more even if the electric field is removed.

The HLM membrane 54 is composed such that the liquid crystals are enclosed in the numerable pores 18 randomly distributed in the macromolecular material. The liquid crystals thus cannot freely change their orientation direction.

When the electric field is applied thereto to give enough energy to liquid crystals larger than that of the macromolecular material, the liquid crystals are reoriented but subjected to the macromolecular material to maintain the state.

Therefore, the orientation direction remembers the state to which the liquid crystals have had an electric field applied. The larger the pores 18 in which the liquid crystals are enclosed, the more difference in orientation among the liquid crystals. This results in a degradation of the memory function. Accordingly, it is desirable to have pores 18 with a diameter of 0.5 μm or less, and which are uniformely dispersed.

Next, the reproduction operation can be performed by radiating a beam for reproduction onto the prerecorded recording medium 50a. The beam for reproduction passing through the recording medium 50a or reflected therefrom may be used as output data.

Furthermore, the data recorded in the recording medium 50a is erased by heating the liquid crystals to the temperature over the melting point of the liquid crystals and under that of the macromolecular materials so as to make the liquid crystals exhibit isotropy. The liquid crystals thus heated are cooled down to be nematic or smectic.

When the liquid crystals are heated to a temperature disclosed as above, molecules of the liquid crystals exhibit isotropy due to thermal motion overcoming the wall energy of the pores 18. The liquid crystals are then cooled down to be nematic or smectic and the HLM membrane 54 becomes opaque.

Again in the recording apparatus in FIG. 1 and if the recoding medium 50a in FIG.3 is used, the switch 19 is turned on to make the power supply 20 apply a voltage across the transparent electrodes 52 and 55 of the recording medium 50a.

Under such a state, the semiconductor laser source 13 radiates a laser beam whose intensity is modulated with data to be recorded onto the mirrors of the polygon mirror 12 via the collimator lens 14 and cylindrical lens 15. The laser beam is deflected thereon and scans the recording medium 50a in the direction X via the toroidal lens 16 and doublet spatial lens 17.

The data is then memorized in the HLM membrane 54 of the recording medium 50a as the orientation state of the moleculars of the liquid crystals in the HLM membrane 54.

When a beam is radiated to the recording medium 50a which has been recorded with the data, a beam whose intensity is modulated with the data is emitted out from the recording medium 50a.

Next in FIG. 2, the recording medium 50 is already recorded with data. A light source 21 is provided to radiate a beam thereto. A beam whose intensity is modulated with the data memorized in the HLM membrane 54 is emitted out from the recording medium 50 to expose the sensitized member 1.

As is already mentioned, there are provided the charging section, developing section, transfer section, fixing section, cleaning section, paper feed section and paper deliver section, etc. (not shown) around the sensitized member 1.

When the beam so modulated with the memorized data is radiated to the sensitized member composed of photoconductive material exhibiting photosensitivity due to colona discharge, a charge image (a charge latent image) corresponding to the data is formed thereon.

The charge image thus formed is developed in the developing section by means of toner. The developed toner image is transferred onto a printing paper in the transfer section and then is fixed thereon in the fixing section. The printed paper is delievered from the paper deliever section.

Excess toner remained on the sensitized member 1 is removed in the cleaning section. The printing paper is fed by the paper feeding section.

The data recorded in the recording medium 50 is printed on the printing papers one after another by means of electrophotography with repeating the process of charging, exposing, paper feeding, developing, transferring, fixing, cleaning and paper delivering.

Other preferred embodiments according to the present invention will be explained with reference to FIGS. 4 and 5.

In the figures, a recording emdium 50b is composed such that a transparent electrode 58, the HLM membrane 54 and PCL member 53 are laminated on a substrate 59 in order. A protection layer may be further laminated on the PCL member 53.

Figure 4:
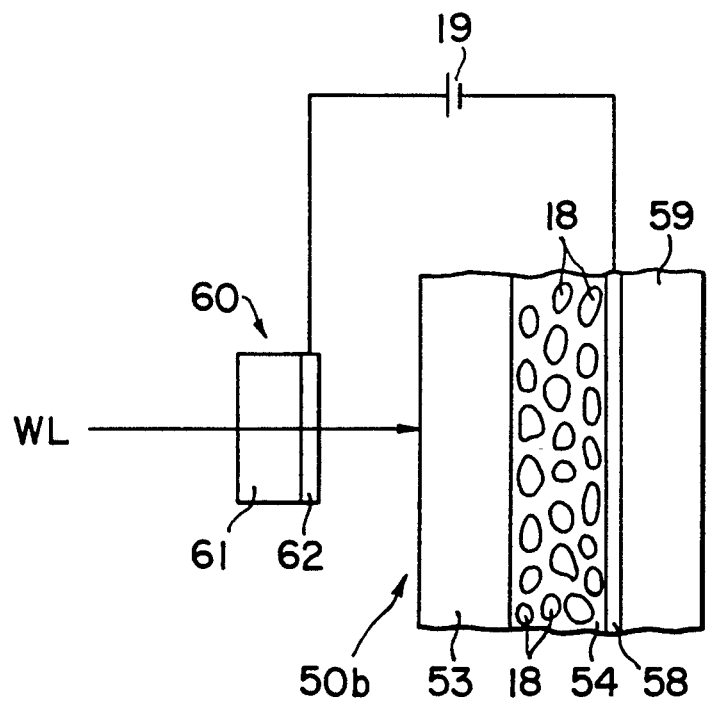
FIGS. 4 to 7 are other examples of the recording medium used in the recording apparatus shown in FIGS. 1 and 2 according to the present invention.

FIG. 4 shows a diagrammatic configuration of a recording system for recording data to be printed to the recording medium 50b. The recording system is provided with a writing head 60 composed of a transparent substrate 61 and transparent electrode 62.

The power supply 19 shown in FIGS. 1 to 3 is to be connected across the substrate 61 and electrode 62 when recording operation is performed.

A light for data-writing (abbreviated in a writing light hereinafter) WL is an electro-magnetic radiation beam whose intensity is modulated with data to be recorded The writing light WL may be focussed on the recording medium 50b via an imaging lens (not shown).

When the writing light WL is incident to the PCL member 53 of the recording medium 50b via the substrate 61 and transparent electrode 62 of the writing head 60, the electric resistance of the PCL member 53 varies accordingly with the intensity of the writing light WL.

The field intensity distribution across the PCL member 53 and transparent electrode 58 also varies accordingly with the amount of the writing light WL, since the power supply 19 applies a voltage across the electrodes 58 and 62.

The data to be recorded is then memorized in the memory membrane 54 in the same manner as explained with reference to FIG. 3.

The recording medium 50b thus recorded with the data is charged uniformally at the entire surface of PCL member 53 by way of colona discharge or other ways in a dark room.

Then, in FIG. 5, when a beam for data-reading (abbreviated in a reading light hereinafter) RL is incident to the PCL member 53 via the memory membrane 54 of the recording medium 50b from the light source 21, the reading light RL is scattered accordingly with the data memorized in the memory membrane 54. Thus, the intensity of incident light on the PCL member 53 varies according to the data.

The elecrical resistance of the PCL member 53 therefore varies accordingly with the data and then a charge pattern corresponding to the data is formed on the PCL member 53.

The charge pattern can be developed and printed on printing papers one after another in the same manner as explained with reference to FIG. 2.

The recording mediums 50, 50a and 50b may be such as flat, cylindrical and belt-like. Furthermore, well known techniques for an electric copying machine are available for the process of charging, paper feeding, developing, transferring, fixing, cleaning and paper delivering.

Figure 6:
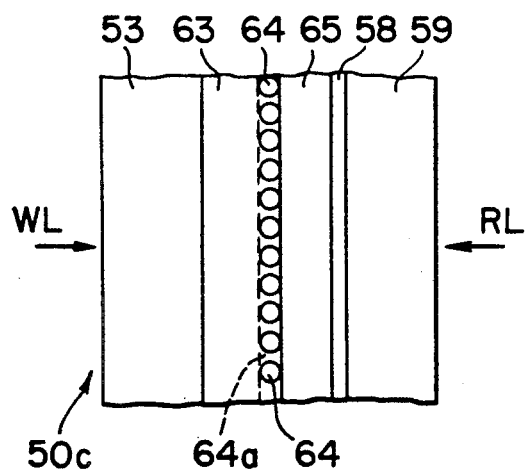
Figure 7:
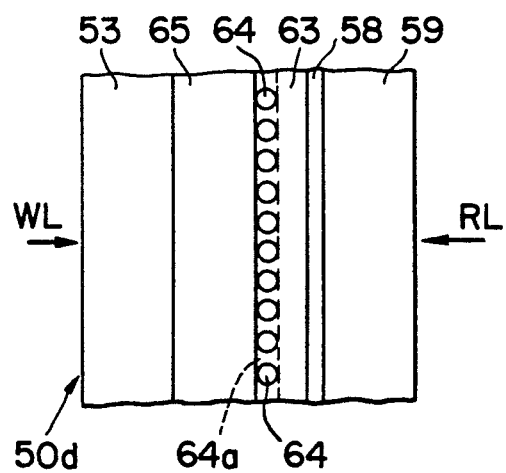

Next, FIGS. 6 and 7 show other preferred embodiments of the recording medium according to the present invention. Both recording mediums 50c and 50d are composed of the PCL member 53, a dielectric layer 63 member enclosing photoconductive grains 64 which form a photoconductive grain (abbreviated in a PCG) layer 64a, a photo-modulation layer (abbreviated in a PML hereinafter) member 65, the transparent electrode 58 and substrate 59.

The difference between the configurations shown in FIGS. 6 and 7 is lamination order of the dielectric layer 63 and PML member 65. Recording/reproduction operation of the recording mediums 50c and 50d are the same with each other.

The PCG layer 64a is formed in such a manner that numberless photoconductive grains 64 are distributed therein separately from each other by depositing or sputtering photoconductive material on the dielectric layer 63 having high insulation resistance via a mask pattern and further a thin film of dielectric material is stacked onto the photoconductive material by deposition or sputtering.

The PML member 65 is composed of photoconductive material such as, liquid crystal, lithium niobate and lanthanum zirconate titanate which changes the optical state (scattering and the plane of polarization, etc.) of a light passing therethrough in accordance with the field intensity.

Furthermore, in FIGS. 6 and 7, a layer of an analyzer may be disposed between the PCL member 53 and PML member 65 on the way of the optical path.

In the case of recording with a writing light WL whose intensity is modulated with data to be recorded, the writing head 60 and the power supply 19 shown in FIG. are used. The power supply 19 is connected across the transparent electrode 62 of the writing head 60 and the transparent electrode 58 of the recording medium 50c or 50d.

Prior to the recording, light is radiated to the recording medium 50c or 50d to produce electron-hole pairs in the photoconductive grains 64 in the PCG layer 64a.

When the writing light WL is incident to the recording medium 50c or 50d via the writing head 60, the electrical resistance of the PCL member 53 varies accordingly with the intensity of the writing light WL so that spark discharge occurs to form a charge image on the recording medium 50c or 50d.

The charges of the charge image is neutralized with the holes of the electron-hole pairs so that the charge image corresponding to the data is recorded in the photoconductive grains 64 in the PCG layer 64a.

An electric field due to the charge image in the photoconductive grains 64 is applied to the PML member 65 in the recording medium 50c or 50d. A reading light RL passing through the PML member 65 is scattered accordingly with the data recorded in the phoconductive grains 64 and is emitted out from the recording medium 50c or 50d.

The recording medium 50c or 50d therefore can be applied to the recording apparatus described with reference to FIG. 1.

Furthermore, when the recording medium 50c or 50d is charged uniformally on the entire surface of the PCL member 53 by colona discharge produced by a charger (not shown) in a dark room, the reading light RL passing through the PML member 65 is scattered accordingly with the data recorded in the photoconductive grains 64.

The electrical resistance of the PCL member 53 varies accordingly with the data so that a charge pattern corresponding to the data is produced on the PCL member 53.

Figure 5:
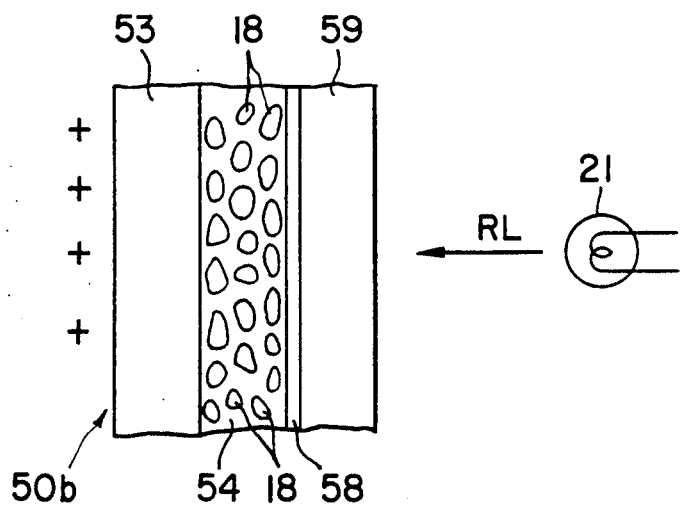

Therefore, the recording medium 50c or 50d can also be used in the same manner as the recording medium 50b shown in FIGS. 4 and 5.

Furthermore, the present invention in not limited to these embodiments, but various variations and modifications may be made without departing from the scope of the present invention.

What is claimed is:

1. A method of electrophotographic printing, comprising the steps of:

arranging a recording medium comprising a photoconductive member and photo-modulation member laminated to each other, both exhibitng photoelectric effect and a sensitized member made of a chargeable photoconductive member such that the recording medium and sensitized member face each other;

radiating a first electro-magnetic radiation beam which is intensity-modulated with data to be recorded to the recording medium at the photoconductive member side thereof to record the data to the photo-modulation member with the photoelectric effect;

radiating a second electro-magnetic radiation beam of constant intensity to the recording medium to emit therefrom a third electro-magnetic radiation beam exhibiting intensity variation subjected to the recorded data;

exposing the sensitized member with the third electro-magnetic radiation beam to form thereon a charge image corresponding to the recorded data;

sticking toner onto the sensitized member formed with the charge image to form thereon a toner image; and transferring the toner image onto a printing paper, thus to perform repeated printing utilizing the data once recorded to the recording medium.

2. The method according to claim 1, wherein the recoding step includes, dispersing liquid crystal in macromolecular material to compose the photo-modulation member; and producing an electric field exhibiting intensity distribution corresponding to the intensity of the first electro-magnetic radiation beam to reorient the liquid crystal accordingly with the intensity distribution, thus to record the data as the state of reorientation of the liquid crystal to the recording medium.

3. The method according to claim 1, wherein the recoding step includes, disposing a grain layer having innumeable photoconductive grains dispersed therein between the photoconducitve member and photo-modulation member;

placing writing means for emitting the first electro-magnetic radiation beam so as to face the recording medium;

radiating a forth electro-magnetic radiation beam of constant intensity to the grain layer to produce electron-hole pairs therein; and radiating the first electro-magnetic radiation beam from the writing means to the recording medium at the photoconductive member thereof and also applying an electric field across the writing means and recording medium to produce discharge thereacross to form a charge image corresponding to the data on the photoconductive member, thus to record the data in the grains.

4. An electrophotographic printing apparatus having a sentisized member of chargeable photoconductive member, comprising:

a recording medium comprising a photoconductive member and photo-modulation member laminated to each other, both exhibitng photoelectric effect and placed so as to face the sensitized member;

recording means for radiating a first electro-magnetic radiation beam which is intensity-modulated with data to be recorded to the recording medium at the photoconductive member side thereof to record the data to the photo-modulation member with the photoelectric effect;

generation means for radiating a second electro-magnetic radiation beam of constant intensity to the recording medium to emit therefrom a third electro-magnetic radiation beam exhibiting intensity variation subjected to the recorded data;

first forming means for exposing the sensitized member by the third electro-magnetic radiation beam to form thereon a charge image corresponding to the recorded data;

second forming means for sticking toner onto the sensitized member formed with the charge image to form thereon a toner image; and transfer means for transferring the toner image onto a printing paper, thus to perform repeated printing utilizing the data once recorded to the recording medium.

5. The apparatus according to claim 4, wherein the photo-modulation member is composed by dispersing liquid crystal in macromolecular material to record the data as the state of reoriention of the liquid crystal.

6. The apparatus according to claim 5, wherein the liquid crystal is nematic liquid crystal.

7. The apparatus according to claim 5, wherein the liquid crystal is smectic liquid crystal.

8. The apparatus according to claim 4, further comprising a grain layer having innumerable photoconductive grains dispersed therein and placed between the photoconductive member and photo-modulation member to record the data as a charge image in the grains.

9. The apparatus according to claim 4, wherein the recording means is provided with a semiconductor laser.

* * * * *